(12) United States Patent
Zeitoun et al.

(10) Patent No.: US 10,099,154 B2
(45) Date of Patent: Oct. 16, 2018

(54) MULTI-EFFECTS DESALINATION SYSTEM

(71) Applicant: KING SAUD UNIVERSITY, Riyadh (SA)

(72) Inventors: Obida Mohamed Zeitoun, Riyadh (SA); Hany Abdelrahman Alansary, Riyadh (SA); Abdullah Othman Nuhait, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 259 days.

(21) Appl. No.: 15/132,715

(22) Filed: Apr. 19, 2016

(65) Prior Publication Data
US 2016/0288012 A1 Oct. 6, 2016

Related U.S. Application Data

(63) Continuation-in-part of application No. 14/679,997, filed on Apr. 6, 2015.

(51) Int. Cl.
*B01D 1/26* (2006.01)
*B01D 1/28* (2006.01)
(Continued)

(52) U.S. Cl.
CPC ............ *B01D 1/26* (2013.01); *B01D 1/2812* (2013.01); *B01D 1/2846* (2013.01); *B01D 3/065* (2013.01);
(Continued)

(58) Field of Classification Search
CPC .......... B01D 1/26; B01D 1/28; B01D 1/2812; B01D 1/2884; B01D 3/065; B01D 3/146; C02F 1/04; C02F 1/041; C02F 1/048
See application file for complete search history.

(56) References Cited

U.S. PATENT DOCUMENTS 3,672,960 A  6/1972 Kays
3,871,968 A  3/1975 Wood et al.
(Continued)

FOREIGN PATENT DOCUMENTS

CN  101531434 A  9/2009
CN  202936219 U  5/2013

OTHER PUBLICATIONS

"Multiple Effect Distillation with Thermal Vapour Compression (MED-TVC)," http://www.entropie.com/en/services/desalination/MEDTVC/ (3 pages).

*Primary Examiner* — Jonathan Miller
(74) *Attorney, Agent, or Firm* — Richard C. Litman (57) ABSTRACT

A multi-effects desalination system includes a plurality of vessels, including a first vessel, a second vessel, a third vessel, a fourth vessel, and a fifth vessel. Each vessel includes a plurality of heat tubes, a sprayer, and a housing including a preheater tube bundle. Each sprayer can be disposed above a respective plurality of heat tubes in each vessel for discharging saline water onto the plurality of heat tubes. A first tube connects a compressor unit with the first vessel. A second tube extends between a saline water source and a plurality of sprayers. Each vessel is configured to accommodate a different effect or stage of desalination occurring in the system. The housing can be configured for collecting fresh water. The fresh water collected in each housing can be transferred by the third tube to a fresh water tank.

6 Claims, 11 Drawing Sheets

(51) Int. Cl.
  *C02F 1/04* (2006.01)
  *B01D 3/06* (2006.01)
  *C02F 1/06* (2006.01)
  *C02F 103/08* (2006.01)

(52) U.S. Cl.
  CPC .............. *C02F 1/041* (2013.01); *C02F 1/06* (2013.01); *C02F 2103/08* (2013.01); *Y02A 20/128* (2018.01)

(56) References Cited

U.S. PATENT DOCUMENTS

| | | | |
|---|---|---|---|
| 3,941,663 A | | 3/1976 | Steinbruchel |
| 4,239,588 A | * | 12/1980 | Engelhardt .............. B01D 1/26 159/17.1 |
| 2012/0018133 A1 | | 1/2012 | Postma et al. |
| 2013/0168224 A1 | * | 7/2013 | Godshall .............. B01D 1/0035 203/10 |

\* cited by examiner

MULTI-EFFECTS DESALINATION SYSTEM

CROSS-REFERENCE TO RELATED APPLICATIONS

This is a continuation-in-part of my prior application Ser. No. 14/679,997, filed Apr. 6, 2015.

BACKGROUND OF THE INVENTION

1. Field of the Invention

The present invention relates generally to desalination systems and, more particularly, to a multi-effect desalination system including a thermal vapor compression system.

2. Description of the Related Art

Multiple effect desalination with thermal-vapor compressor (MED-TVC) is a process used for sea water desalination. Typically, MED-TVC systems produce desalinated (distillate) water from seawater (salt water), through a multi-stage system which includes horizontal tube bundles at each stage. In each stage, vapor condenses inside the tubes. Saline water evaporates in one stage, and the vapor flows into the tubes of a subsequent stage. Each stage reuses energy from a previous stage. However, the vapor velocity inside the heat tubes drops dramatically as it condenses along the heat tubes resulting in a large decrease in the heat transfer coefficient of condensation throughout the heat tubes' inner surface. Also, the two phase pressure loss caused by vapor condensing inside the heat tubes is high, leading to considerable temperature loss and an increase in heating surface area.

Thus, an improved multi-effects desalination system solving the aforementioned problems is desired.

SUMMARY OF THE INVENTION

A multi-effects desalination system includes a plurality of vessels, including, for example, a first vessel, a second vessel, a third vessel, a fourth vessel, and a fifth vessel. Each vessel includes a plurality of heat tubes, a sprayer, and a housing including a preheater tube bundle. Each sprayer can be disposed above a respective plurality of heat tubes for discharging saline water (SW) onto the plurality of heat tubes in the respective vessel. A first tube connects a compressor unit with the first vessel. A second tube extends between a saline water source SWS and a plurality of sprayers. Each of the vessels is connected to a fresh water tank (FWT) by a third tube. Each vessel is configured to accommodate a different effect or stage of desalination occurring in the system. The housing can be configured for collecting fresh water F. The fresh water collected in each housing can be transferred by the third tube to a fresh water tank (FWT), The desalination system can also include a power source, such as solar panels or wind turbines, coupled to the first pump, the second pump, the third pump, and/or the fourth pump to power the desalination system.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Referring to FIGS. 1-4, a multi-effects desalination system 10 includes a plurality of vessels, including, for example, a first vessel 100a, a second vessel 100b, a third vessel 100c, a fourth vessel 100d, and a fifth vessel 100e. Each vessel 100a-100e can include a plurality of heat tubes 400, each of the plurality of heat tubes 400 having a first end operatively configured to receive the steam, and a second end operatively configured for releasing uncondensed steam, a plurality of sprayers (e.g., a first sprayer 190a, a second sprayer 190b, a third sprayer 190c, a fourth sprayer 190d, and a fifth sprayer 190e) operatively configured for dispersing saline water onto the heat tubes 400, a housing 120 operatively coupled to the heat tubes 400 for receiving the uncondensed steam released from each of the heat tubes 400, and means for collecting and discharging brine water. The housing 120 further includes a preheater tube bundle 110 and means for collecting and discharging fresh water, as illustrated in FIGS. 1-4, at least one of the plurality of sprayers 190a-190e being coupled to a corresponding preheater tube bundle 110.

Figure 1:
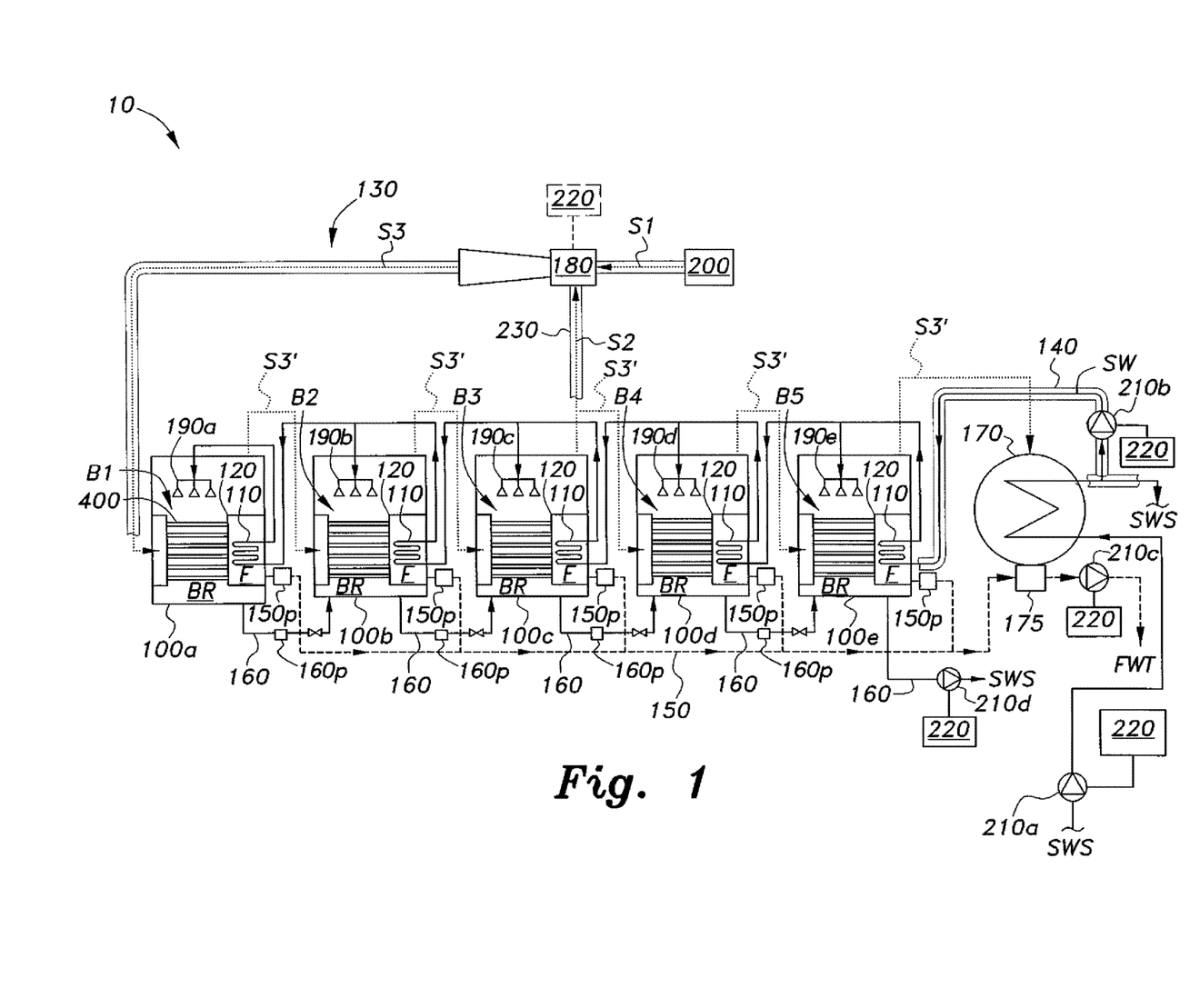
FIG. 1 is a schematic diagram of an embodiment of a multi-effects desalination system according to the present invention.

Each sprayer 190a-190e can be disposed above the plurality of heat tubes 400 in a respective vessel for discharging saline water SW onto the plurality of heat tubes 400. A first tube 130 connects a compressor unit 180 with the first vessel 100a. The compressor unit 180 configured for operatively providing a first steam S1. As illustrated in FIG. 1, it is to be noted that the compressor unit 180 includes an input for receiving steam from the steam source 200 and at least one additional input, such as for receiving a second steam S2. A second tube 140 extends between a saline water source SWS and a plurality of sprayers 190a-190e. Each of the housings 120 can be connected to a fresh water tank FWT by a third tube 150. Each vessel can be configured to accommodate a different effect or stage of desalination occurring in the system 10. Each housing 120 can be configured for collecting fresh water F, such as the fresh water F produced from the condensation of the steam S3 inside the plurality of heat tubes 400, as well as the fresh water F produced from the condensation of the steam S3 on the outer surfaces of the preheater tube bundle 110. The fresh water collected in each housing 120 can be transferred by the third tube 150 to a fresh water tank FWT.

The system 10 also includes a condenser unit 170 configured for receiving cooling fluid from a saline water source SWS and distributing saline water to each preheater tube bundle 110 in each housing 120 of each vessel 100a-100e, the condenser unit 170 being positioned in communicating relation with the last vessel 100e, a first pump 210a operatively coupled for pumping the saline water from a saline water source SWS into the condenser unit 170, a second pump 210b operatively coupled for pumping the saline water from the condenser unit 170 to one of the plurality of vessels 100a-100e, a third pump 210c operatively couple for pumping fresh water F from each of the plurality of vessels 100a-100e to a fresh water tank FWT, and a fourth pump 210d operatively couple for pumping brine water BR to the saline water source SWS. It is to be understood that a power source 220 can be operatively couple to the first pump 210a, the second pump 210b, the third pump 210c, and the fourth pump 210d. each of the pumps 210a-210d. The condenser unit 170 can include a condenser hot well 175, such as for collecting fresh water F from all of the stages of the system 10. The first pump 210a can be configured for pumping saline water SW from the saline water source SWS, such as the ocean, through the second tube 140 towards the condenser unit 170. The second pump 210b can be configured for pumping saline water SW through the second tube 140 toward the first vessel 100a. The third pump 210c can be configured for pumping fresh water F into the fresh water tank FWT. For example, the third pump 210c can discharge the fresh water F, such as the fresh water F collected from all stages, from a low pressure environment, such as from inside the condenser hot well 175, into an atmospheric pressure environment, such as the fresh water tank FWT. The fourth pump 210d can be configured for pumping brine water BR into the saline water source SWS.

Figure 2:
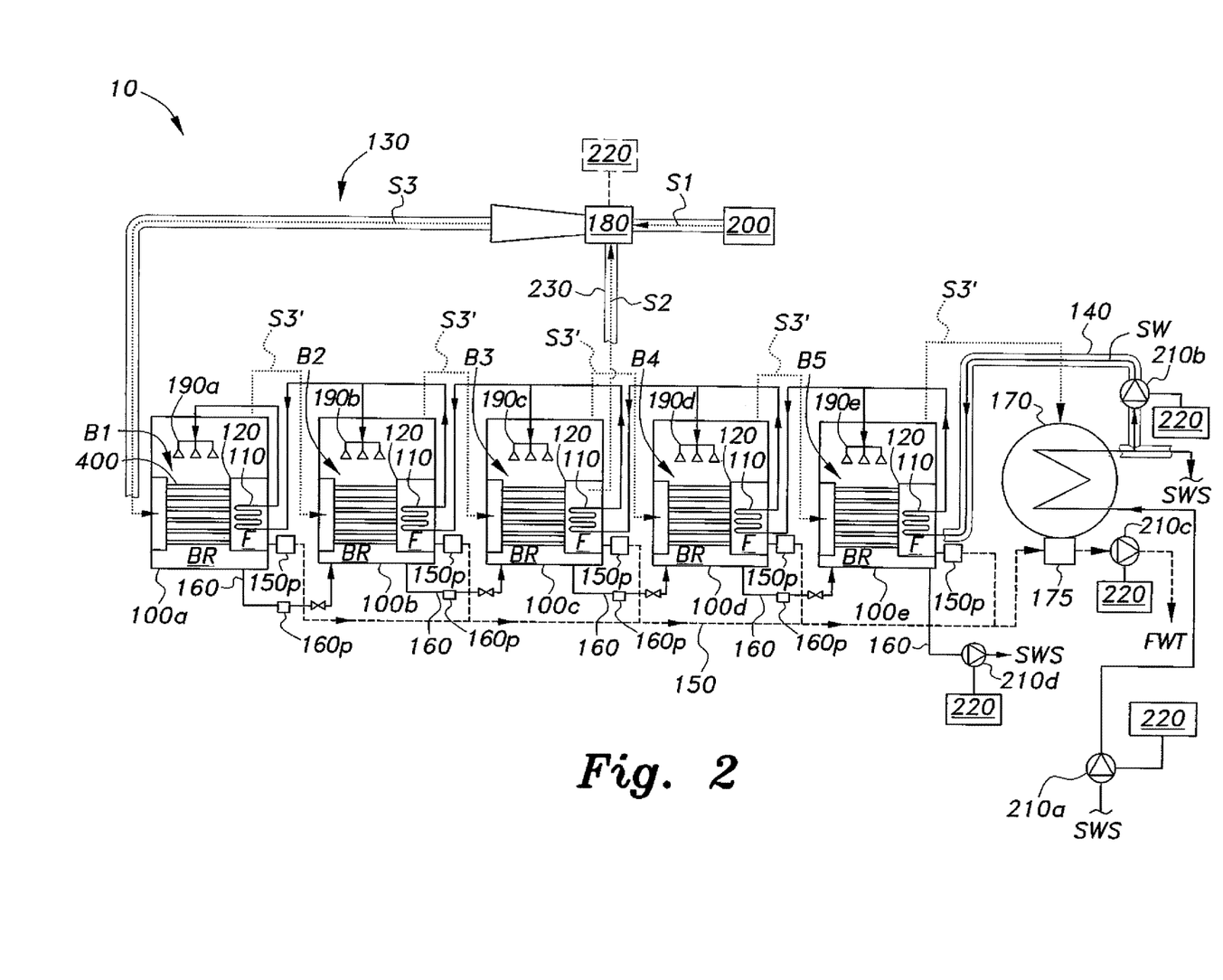
FIG. 2 is a schematic diagram of another embodiment of a multi-effects desalination system according to the present invention.
Figure 3:
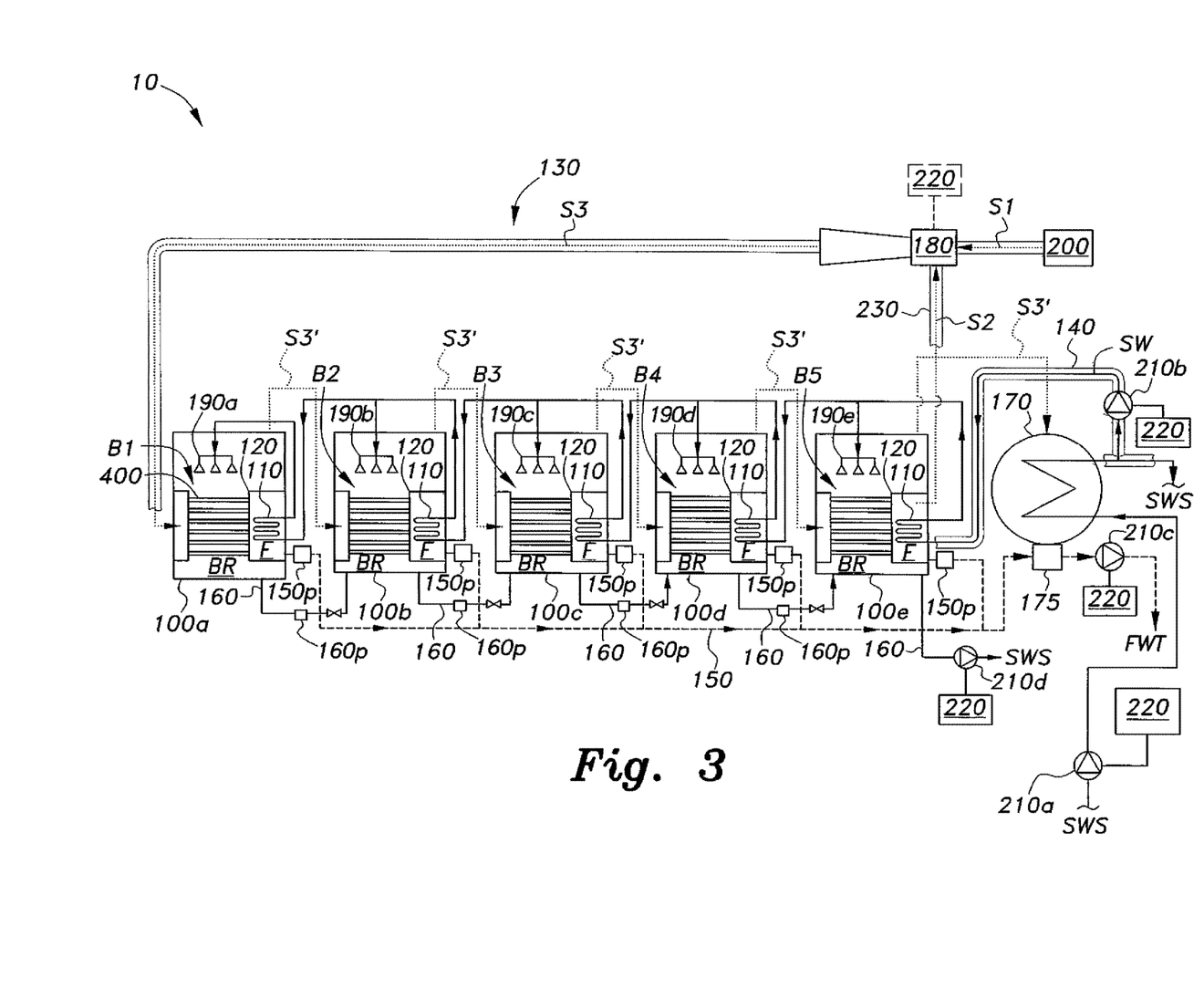
FIG. 3 is a schematic diagram of another embodiment of a multi-effects desalination system according to the present invention.
Figure 4:
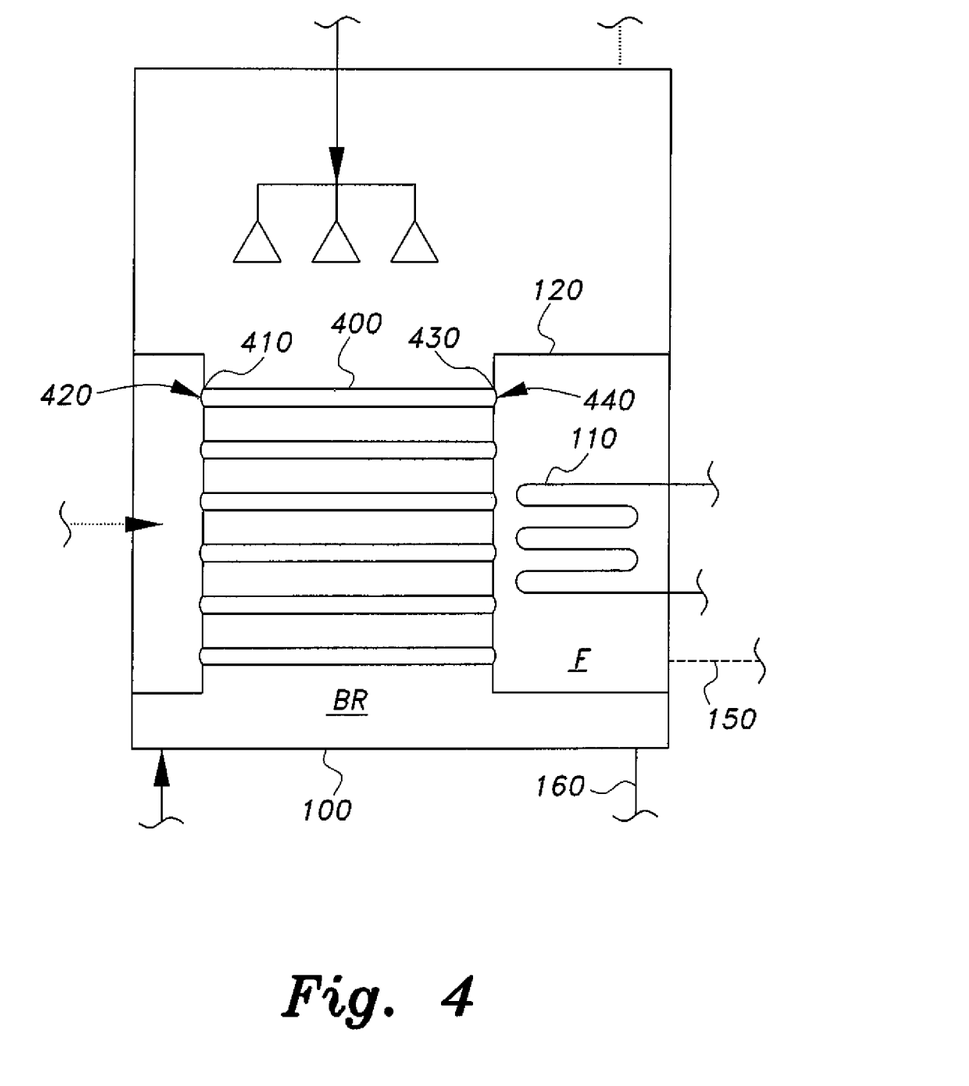
FIG. 4 is a schematic diagram of a portion of the desalination system shown in FIGS. 1-3, illustrating a modification of an integrated evaporator preheater concept for the multi-effects desalination system according to the present invention.
Figure 5A:
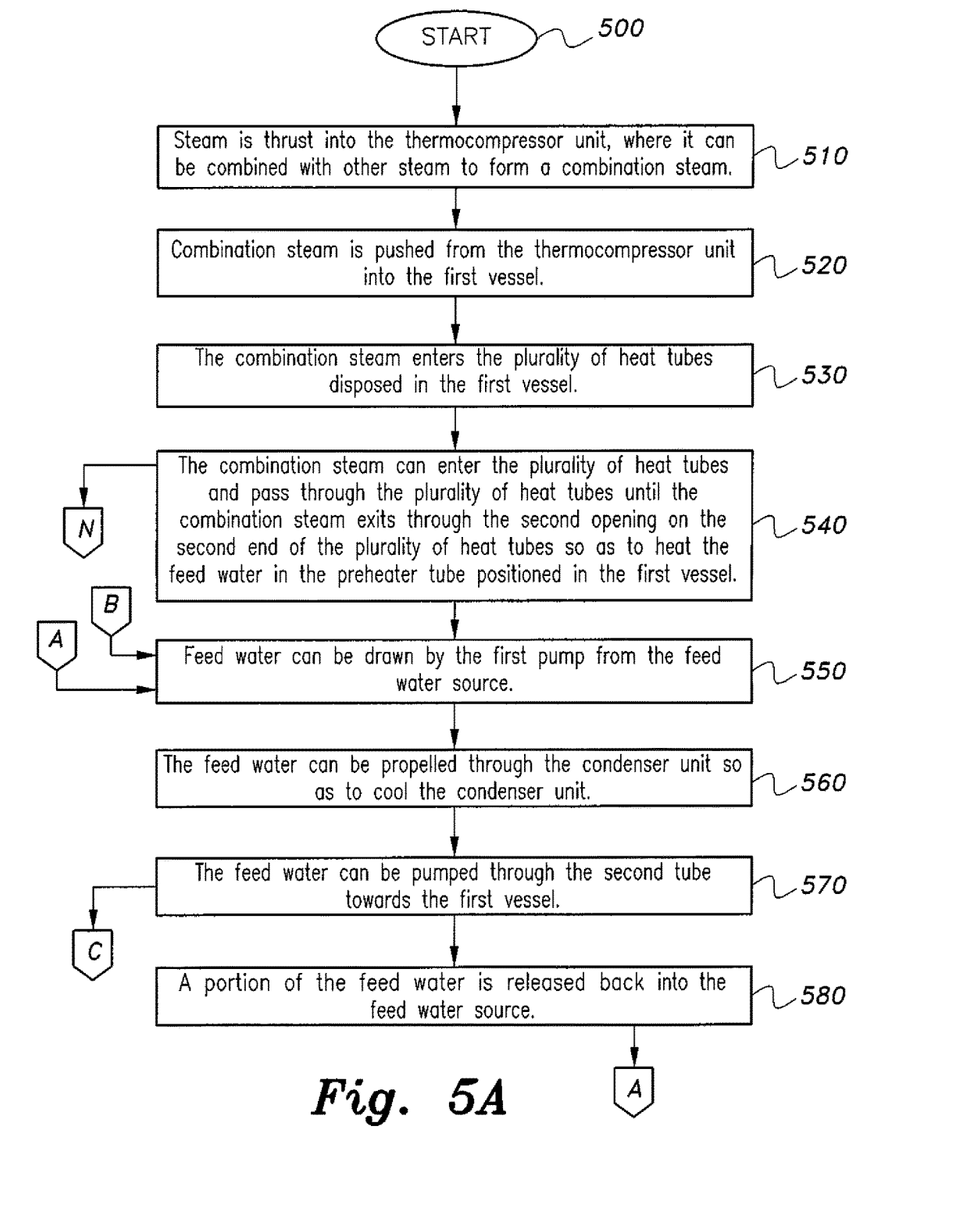
FIG. 5A is a flowchart illustrating a method to desalinate seawater according to the present invention.
Figure 5B:
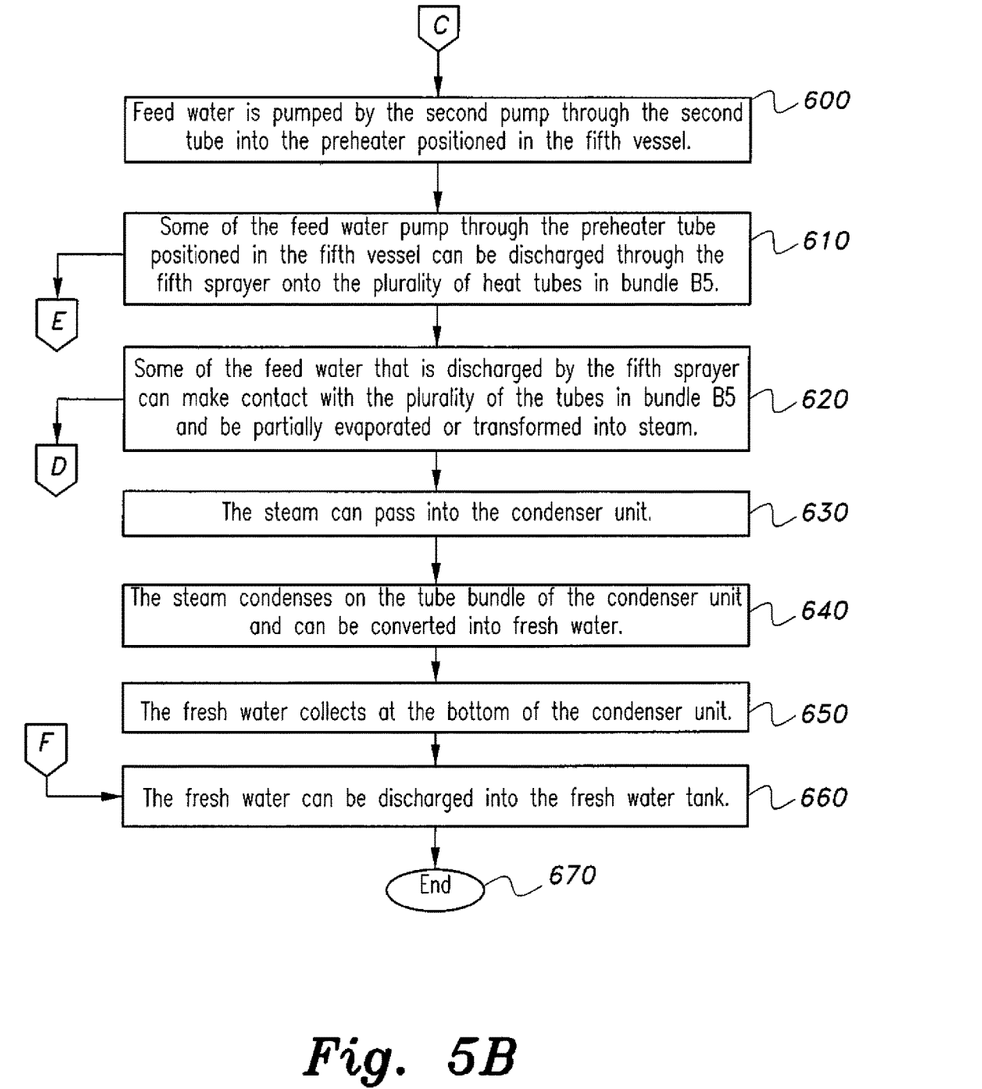
FIG. 5B is a flowchart illustrating a method to desalinate seawater according to the present invention.
Figure 5C:
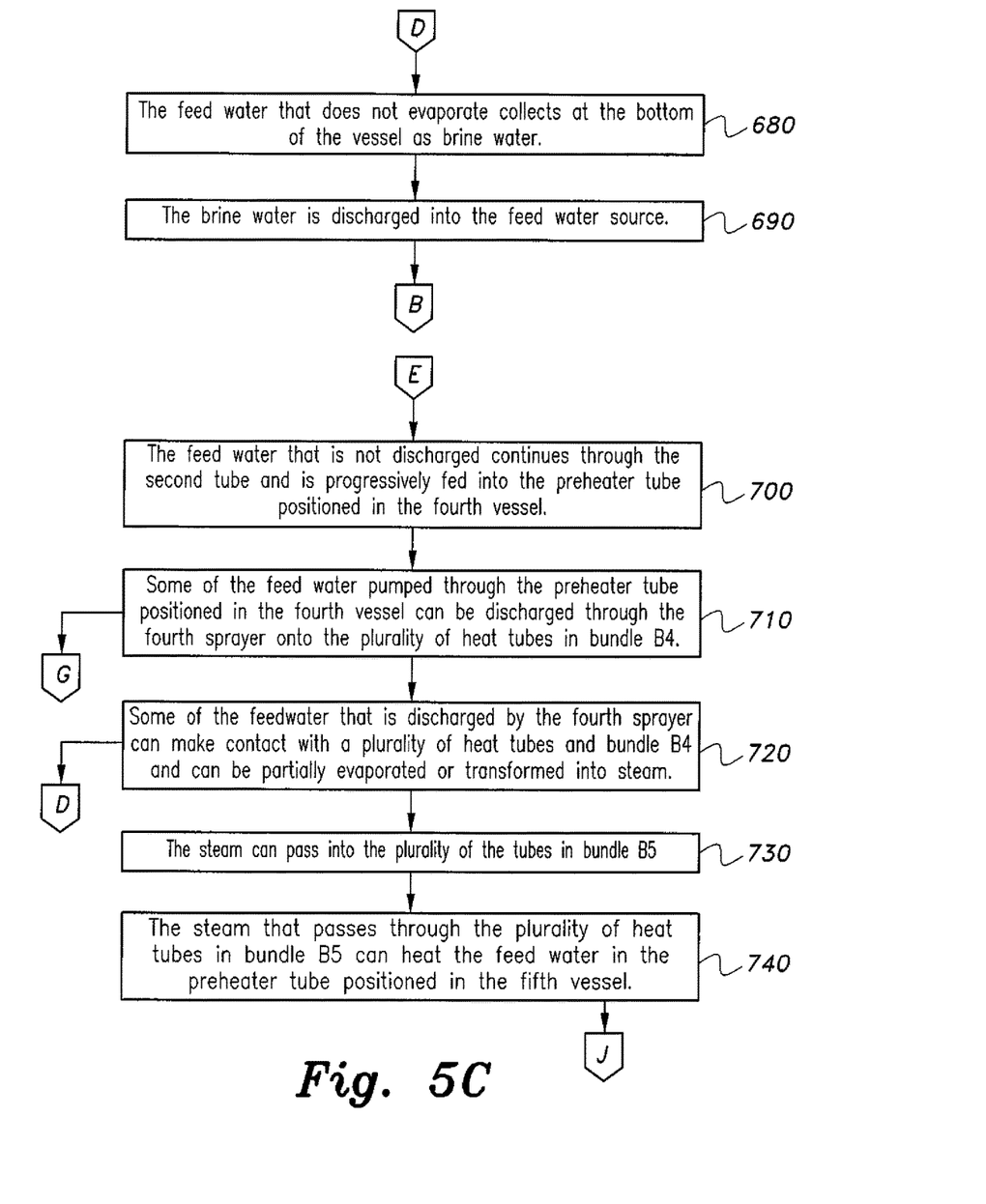
FIG. 5C is a flowchart illustrating a method to desalinate seawater according to the present invention.
Figure 5D:
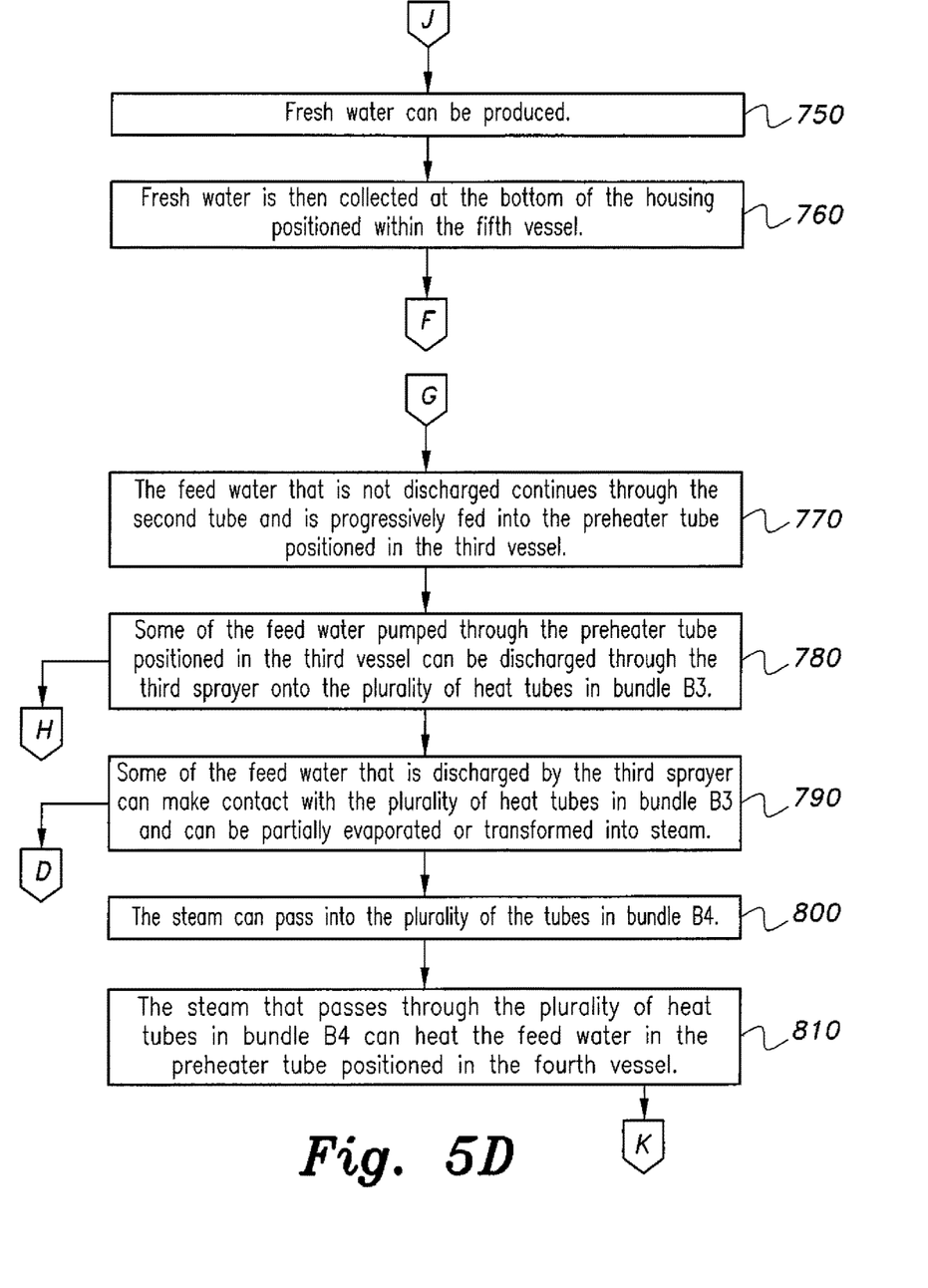
FIG. 5D is a flowchart illustrating a method to desalinate seawater according to the present invention.
Figure 5E:
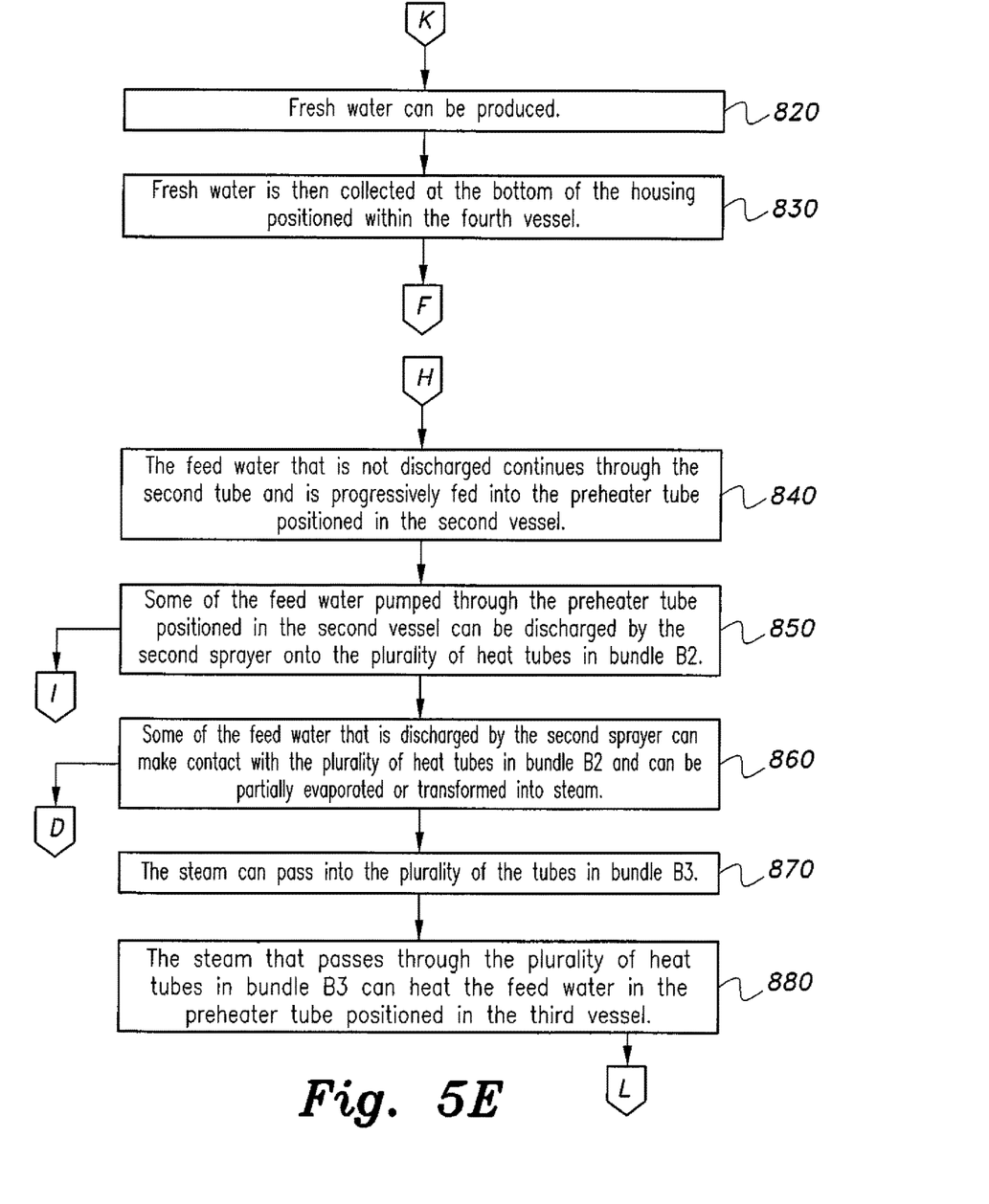
FIG. 5E is a flowchart illustrating a method to desalinate seawater according to the present invention.
Figure 5F:
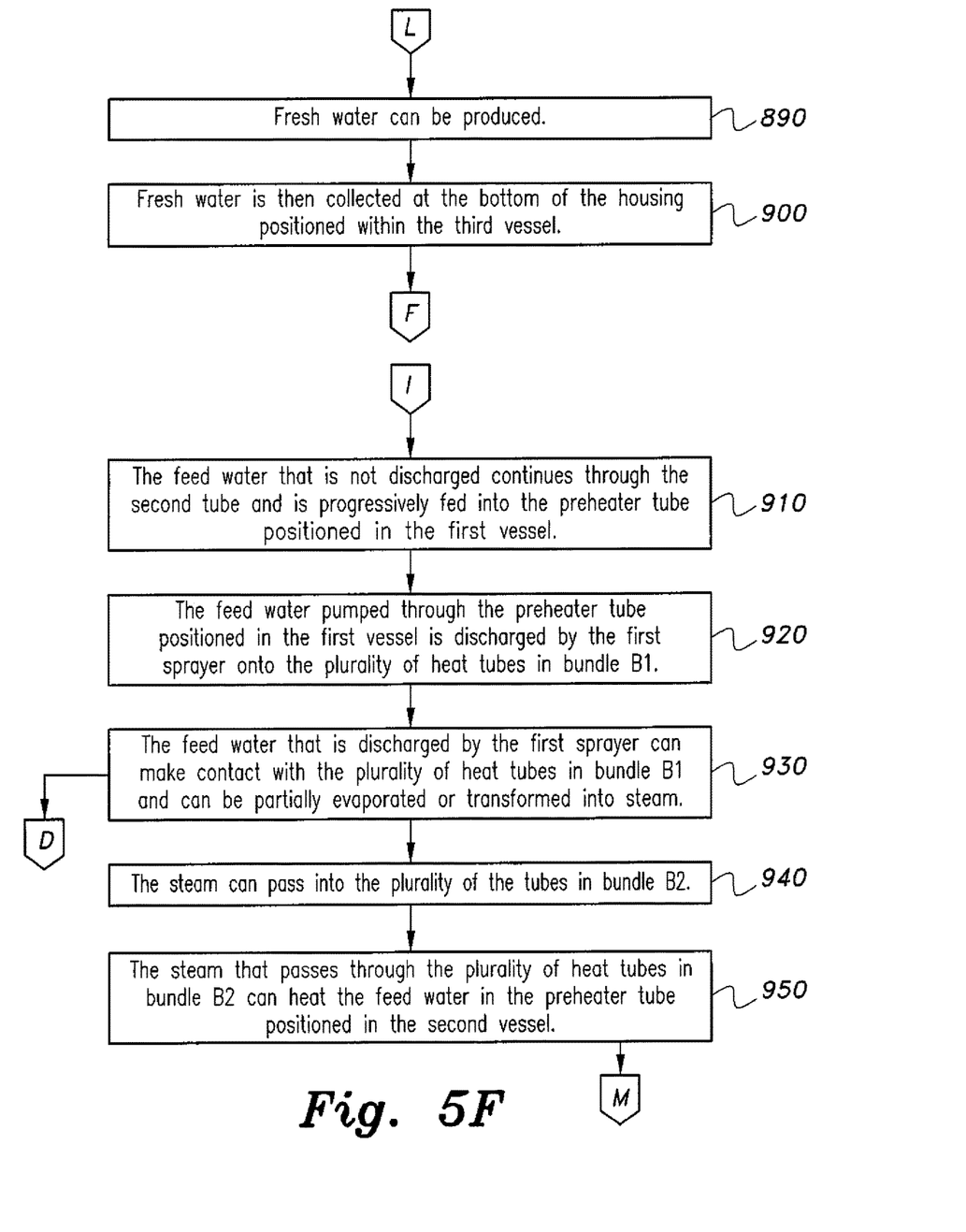
FIG. 5F is a flowchart illustrating a method to desalinate seawater according to the present invention.
Figure 5G:
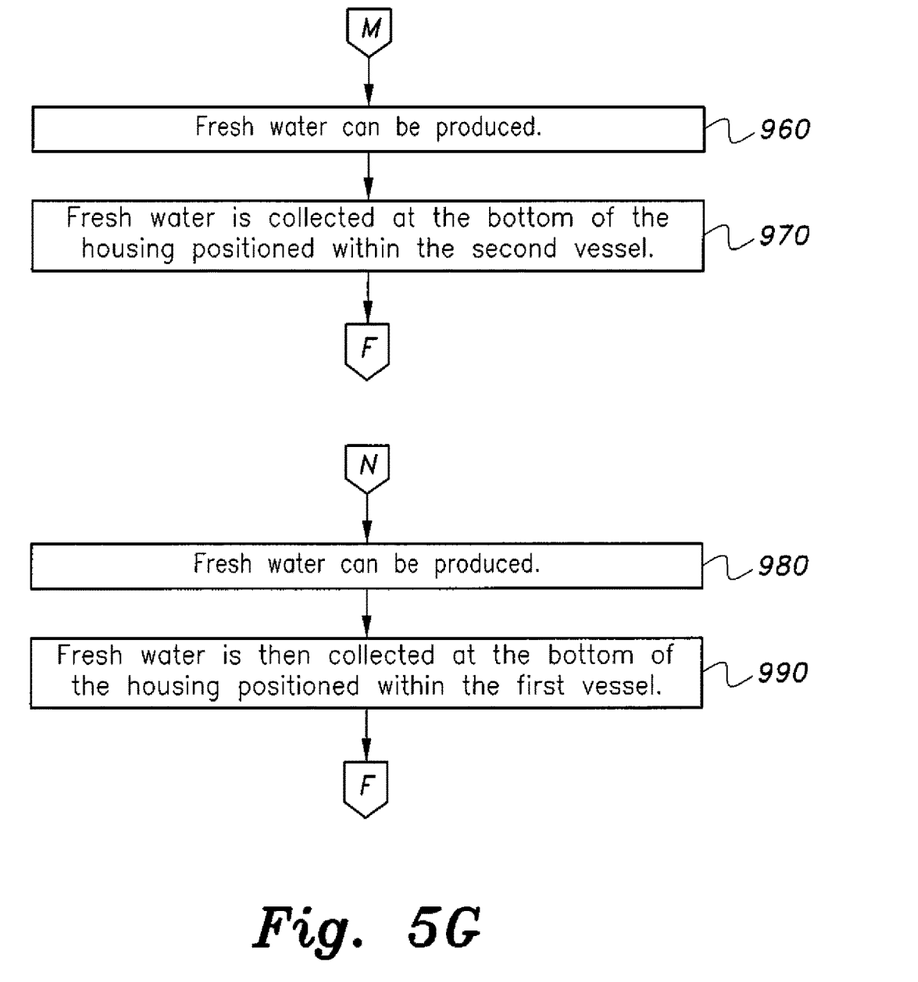
FIG. 5G is a flowchart illustrating a method to desalinate seawater according to the present invention.

As can be seen more clearly in FIG. 4, each of the plurality of heat tubes 400 has a first end 410 including a first opening 420 adapted to receive vapor, such as steam, from a steam source 200, and a second end 430 including a second opening 440 positioned in communicating relation with the housing 120 including preheater tube bundle 110, as illustrated in FIGS. 1-3. The second opening 440 can be adapted for releasing uncondensed steam inside each of the plurality of heat tubes 400 into the housing 120 so as to heat the saline water SW being propelled inside each of the preheating tube bundle 110 before the saline water SW is dispersed from the sprayers 190a-190e, onto the plurality of heat tubes 400 disposed within the plurality of vessel 100a-100e.

The compressor unit 180 can be a thermal vapor compressor unit or a mechanical compressor unit. If the compressor unit 180 is mechanical it can be connected to a power source 220, such as a generator, solar panels, and wind turbines. The compressor unit 180 can be coupled to the first pump 210a, the second pump 210b, the third pump 210c, and/or the fourth pump 210d so as to power the desalination system 10. It is to be noted that a thermal vapor compressor unit will not require a power source because it will be powered by the steam generated from the system 10.

It is contemplated that there can be "n" effects (stages) and "n" corresponding vessels in the desalination system 10, whereas "n" can be either greater than or less than five. It is to be noted that each of the plurality of effects (stages) occurs in a separate vessel. For example, the first effect can take place in the first vessel 100a, the second effect can take place in the second vessel 100b, the third effect can take place in the third vessel 100c, the fourth effect can take place in the fourth vessel 100d, and the fifth effect can take place in the fifth or last vessel 100e, Further, each effect (stage) can operate at a higher boiling temperature and pressure than the subsequent effect (stage).

The plurality of vessels 100a-100e can have any suitable shape, such as a generally rectangular shape, and can be arranged in a horizontal configuration, as illustrated in FIGS. 1-3. For example, each of the plurality of vessels 100a-100e can be configured for collecting brine water BR. Further, each of the plurality of vessels 100a-100e can include an opening so as to allow the brine water BR to flow and flash through the successive vessels, e.g., from the first vessel 100a through the second vessel 100b, the third vessel 100c, the fourth vessel 100d, and the fifth vessel 100e, so that the brine water BR can be discharged into the saline water source SWS. This flashing process can assist vapor formation and at the same time cool the brine water BR before it is discharged from the system 10. The brine water BR collected in each of the plurality of vessels 100a-100e can be transferred to an adjacent vessel, such as vessels 100b-100e, through a fourth tubing 160, which extends to a saline water source SWS. It is to be noted that the fourth tubing 160 connecting each of the vessels for the transferring the discharged brine water BR to successive vessels includes a pump 160p to aid in propelling the brine water BR from one vessel to the next.

Each of the plurality of heat tubes 400 can be formed from steel, or any suitable material that can act as a conduit for the transfer of heat, and can be arranged in any suitable configuration such as a bundle, such as bundle B1, bundle B2, bundle B3, bundle B4, and bundle B5. Further, the plurality of heat tubes 400 can have any suitable length and diameter sufficient to allow a suitable amount of steam, such as the steam emitted by the compressor unit 180, to pass through so as to evaporate a desired amount of vapor in each stage and to heat the saline water SW in the corresponding one of the plurality of preheater tube bundle 110.

The steam can then be transferred through each of the plurality of heat tubes 400, such as the plurality of heat tubes 400 in bundles B1-B5, to the preheater tube bundle 110 positioned in the housing 120 within the corresponding vessel 100a-100d. The plurality of heat tubes 400 in bundles B1-B5 can be configured for condensing, such as partially condensing, the steam flowing through each of the plurality of heat tubes 400, in the respective bundle, such as bundle B1-B5 so as to avoid an increase in temperature loss due to a decrease in heat size. The remaining steam can be condensed on the surface of the preheater tube bundle 110 utilized to preheat the saline water SW.

A portion of the steam or vapor, can be used to preheat the saline water SW passing through the preheater tube bundle 110 towards the sprayer 190a-190e. The remaining steam passing into the housing 120 can condense upon contacting the plurality of preheater tubes 110. The fresh water F produced in each stage can be the sum of the steam condensed inside each of the plurality of heat tubes 400 in a respective bundle, such as bundle B1-B5, and the steam condensed on the outer surfaces of the preheater tube bundle 110 and can be transferred into the condenser hot well 175 prior to being discharged into the fresh water tank FWT.

Each of the plurality of sprayers 190a-190e can be disposed within a respective vessel 100a-100e over the plurality of heat tubes 400 in bundles B1-B5. Each of the plurality of sprayers 190a-190e are connected to the second tube 140 for receiving the saline water SW from the saline water source SWS. The plurality of sprayers 190a-190e can be any suitable type of sprayer, as is well known in the art. The plurality of sprayers 190a-190e are configured to discharge the saline water SW received from the saline water source SWS onto the plurality of heat tubes 400 disposed in one of the plurality of vessels 100a-100e.

For example, the first sprayer 190a can be configured to spray saline water SW onto the plurality of heat tubes 400 disposed within the first vessel 100a. Saline water SW can be sprayed onto the plurality of heat tubes 400 disposed within the other vessels 100b-100e in a similar fashion. It is to be noted that the saline water SW can be fed through the second tube 140 and into the plurality of sprayers 190a-190e by any suitable configuration. For example, the plurality of sprayers 190a-190e can be arranged in series, as illustrated in FIGS. 1-3, in which the saline water SW can pass through each of the preheater tube bundle 110 and corresponding sprayer, such as sprayers 190a-190e, successively.

The compressor unit 180 can be configured for receiving a first steam S1 from the steam source 200, such as a conventional boiler or any type of suitable steam boiler operating from a renewable energy source such as solar, geothermal, waste heat, or a biomass energy source. The force with which the first steam S1 is propelled through the compressor unit 180 can be used to extract steam S2 from one vessel one or from one or more vessels, such as directly from the third vessel 100c, as illustrated in FIG. 1, from the housing 120 within a vessel, such as the third vessel 100c, as illustrated in FIG. 2, or from the housing 120 in the last vessel, such as the fifth vessel 100e, as illustrated in FIG. 3. The second steam S2 can be the steam produced within a vessel after water from the sprayer contacts the plurality of heat tubes 400.

Combination steam S3 can be fed into the first vessel 100a, and, thereby transfer heat, in the form of the combination steam S3, into the plurality of heat tubes 400 in bundle B1 disposed in the first vessel 100a. A potential advantage of configuring the system 10 so as to withdraw steam from the housing, such as housing 120 in the third vessel 100e, as illustrated in FIG. 2, is a reduction in the evaporator surface area of the third effect, taking place in the third vessel 100c. Another potential advantage of configuring the system 10 so as to withdraw steam from the housing, such as housing 120 in the third vessel 100c or in the firth vessel 100e, as illustrated in FIGS. 2 and 3, respectively, is a reduction in the load on the compressor unit 180 as a result of the increase in pressure in the suction side. It is to be noted that the system 10 should be operated at low temperature, such as below 70° C., and at low concentration, such as less than 1.5, so as to avoid corrosion and scaling problems.

By way of operation, after the saline water SW is drawn into the system 10 and through the preheater tube bundle 110, the plurality of sprayers 190a-190e can release the saline water SW onto the plurality of heat tubes 400 to generate heat, in the form of steam. The steam can be created by evaporation of saline water SW contacting the plurality of heat tubes 400. This steam exits the vessel and flows into the plurality of heat tubes 400 of an adjacent vessel. In other words, the steam, created by the saline water SW evaporating in one effect, is allowed to flow into an adjacent effect. The steam or vapor flowing inside the plurality of heat tubes 400 of a vessel then flows into the housing 120 to heat preheater tube bundle 110 in the vessel. A portion of the steam can be condensed inside the plurality of heat tubes 400 and the remaining portion of steam can be condensed on the surface(s) of the preheater tube bundle 110 within the housing 120 to provide freshwater that can be collected in fresh water tray F and can be transferred to fresh water tank FWT through the third tube 150. It is to be noted that the third tube 150 configured for transferring the discharged fresh water F to the fresh water tank FWT includes a pump 150p to aid in propelling the fresh water F from each vessel.

The steam formed in the last vessel, such as the fifth vessel 100e, can be forwarded to the condenser unit 170, where it condenses and produces fresh water F that can be pumped into the fresh water tank FWT at atmospheric pressure and at a temperature that is less than that of the fresh water F in the system 10. As condensation occurs on outer surfaces of the pipes or tubes and not inner surfaces, pressure drop inside the tube and associated temperature loss are avoided.

Referring to FIGS. 5A-5G, a process by which saline water SW, such as seawater, can be desalinated using the system 10 is described. To start (Step 500), steam S1 can be thrust into the compressor unit 180 where it can be combined with other steam S2, such as from at least one of the plurality of vessels 100a-100e, to form the combination steam S3 (Step 510). Combination steam S3 can then be pushed from the compressor unit 180 through the first tube 130 and into the first vessel 100a (Step 520). The combination steam S3 then enters the plurality of heat tubes 400 disposed in the first vessel 100a (Step 530). The combination steam S3 can enter the plurality of heat tubes 400 through the first opening 420 on each first end 410 of each of the plurality of heat tubes 400 and can pass through the plurality of heat tubes 400, such as into the housing 120.

It is to be noted that the combination steam S3 partially condenses inside the plurality of heat tubes 400 and the uncondensed part exits through the second opening 440 on the second end 430 of each of the plurality of heat tubes 400 so as to heat the preheater tube bundle 110 positioned in the housing in the first vessel 100a (Step 540). As the combination steam S3 passes and condenses though the plurality of heat tubes 400 it can heat the plurality of heat tubes 400 disposed in the first vessel 100a. It is to be noted that the plurality of heat tubes 400 disposed in the other vessels 100b-100e can be heated in a similar fashion.

Saline water SW can be drawn by the first pump 210a from the saline water source SWS (Step 550). The saline water SW can then be propelled through the condenser unit 170 so as to cool the condenser unit 170 (Step 560). After the saline water SW passes through the condenser unit 170, the saline water SW can be pumped through the second tube 140 towards the first vessel 100a (Step 570). A portion of the saline water SW can, however, be released back into the saline water source SWS (Step 580).

The portion of the saline water SW that is not discharged back into the saline water source SWS, as described in Step 580, can be pumped by the second pump 210b through the second tube 140 and onto the preheater tube bundle 110 positioned in the fifth vessel 100e (Step 600). Some of the saline water SW pumped through the preheater tube bundle 110 positioned in the fifth vessel 100e can, subsequently, be discharged through the fifth sprayer 190e onto the plurality of heat tubes 400 in bundle B5 (Step 610). The portion of saline water SW that is discharged by the fifth sprayer 190e can make contact with the plurality of heat tubes 400 in bundle B5 and evaporate or transformed to steam (Step 620).

The steam produced from the evaporation of the saline water SW making contact with the plurality of heat tubes 400 in bundle B5 can pass into the condenser unit 170 (Step 630), as illustrated by S3'. The steam can then come in contact with the condenser unit 170, condense on the tube bundle of the condenser unit 170, and be converted into fresh water F (Step 640). The fresh water F then collects at the bottom of the condenser unit 170 (Step 650). The fresh water F can subsequently be discharged into the fresh water tank FWT (Step 660) and the process ends (Step 670). The saline water SW that does not evaporate, however, can be collected at the bottom of the fifth vessel 100e as brine water BR (Step 680). The brine water BR can then be discharged into the saline water source SWS (Step 690). The process continues as described in Step 550.

The portion of the saline water SW in the second tube 140 that is not discharged through the fifth sprayer 190e as described in Step 610 continues through the second tube 140 and can be progressively fed into the preheater tube bundle 110 positioned in the fourth vessel 100d (Step 700). Some of the saline water SW pumped through the preheater tube bundle 110 positioned in the fourth vessel 100d can, subsequently, be discharged through the fourth sprayer 190d onto the plurality of heat tubes 400 in bundle B4 (Step 710). The portion of saline water SW that is discharged by the fourth sprayer 190d can make contact with the plurality of heat tubes 400 in bundle B4 and can evaporate or transform to steam (Step 720). The steam can then pass into the plurality of heat tubes 400 in bundle B5 (Step 730).

The non-condensed steam that passes through the plurality of heat tubes 400 in bundle B5 can preheat the saline water SW in the preheater tube bundle 110 positioned within the fifth vessel 100e (Step 740). A portion of the steam condenses upon making contact with the preheater tube bundle 110 positioned within the fifth vessel 100e. Fresh water F can then be formed (Step 750). Fresh water F can then be collected at the bottom of the housing 120 positioned within the fifth vessel 100e (Step 760). The process continues as described in Step 660. It is to be noted that the steam produced from the evaporation of the saline water SW making contact with the plurality of heat tubes 400 in bundle B4 can pass into the fifth vessel 100e, as illustrated by S3'. The saline water SW that does not make contact with the plurality of heat tubes 400 in bundle B4 and evaporate, however, collects at the bottom of the fourth vessel 100d and continues as described in Step 680.

The portion of the saline water SW in the second tube 140 that is not discharged through the fourth sprayer 190d as described in Step 710 continues through the second tube 140 and can be fed into the preheater tube bundle 110 positioned in the third vessel 100c (Step 770). Some of the saline water SW pumped through the preheater tube bundle 110 positioned in the third vessel 100e can, subsequently, be discharged through the third sprayer 190c onto the plurality of heat tubes 400 in bundle B3 (Step 780). The portion of saline water SW that is discharged by the third sprayer 190c can make contact with the plurality of heat tubes 400 in bundle B3 and can be partially evaporated or transformed to steam (Step 790). The steam can then pass into the plurality of heat tubes 400 in bundle B4 (Step 800). It is to be noted that a portion of the steam produced in the third vessel 100e, the fourth vessel 100d, or the fifth vessel 100e can also be drawn into the compressor unit 180 to be combined with the steam S1 being release by the steam source 200, as illustrated in FIGS. 1 and 3, as well as from the housing 120 positioned in the third vessel 100c, as illustrated in FIG. 2.

The steam that passes through the plurality of heat tubes 400 in bundle B4 can be partially condensed inside the plurality of heat tubes 400 and the remaining steam can preheat the saline water SW in the preheater tube bundle 110 positioned within the fourth vessel 100d (Step 810). A portion of the steam condenses upon making contact with the preheater tube bundle 110 positioned within the fourth vessel 100d. Fresh water F can then be produced (Step 820). Fresh water F can be then collected at the bottom of the housing 110 positioned within the fourth vessel 100d (Step 830). The process continues as described in Step 660. It is to be noted that the steam produced from the evaporation of the saline water SW making contact with the plurality of heat tubes 400 in bundle B3 can pass into the fourth vessel 100d, as illustrated by S3'. The saline water SW that does not make contact with the plurality of heat tubes 400 in bundle B3 and does not evaporate, however, collects at the bottom of the third vessel 100c and continues as described in Step 680.

The portion of the saline water SW in the second tube 140 that is not discharged through the third sprayer 190c as described in Step 780 continues through the second tube 140 and can be fed into the preheater tube bundle 110 positioned in the second vessel 100b (Step 840). Some of the saline water SW pumped through the preheater tube bundle 110 positioned in the second vessel 100d can, subsequently, be discharged through the second sprayer 190b onto the plurality of heat tubes 400 in bundle B2 (Step 850). The portion of saline water SW that is discharged by the second sprayer 190b can make contact with the plurality of heat tubes 400 in bundle B2 and can be partially evaporated or transformed into steam (Step 860). The steam can then pass into the plurality of heat tubes 400 in bundle B3 (Step 870).

The steam that passes through the plurality of heat tubes 400 in bundle B3 can be partially condensed inside the plurality of heat tubes 400 and the remaining steam can heat the saline water SW in the preheater tube bundle 110 positioned within the third vessel 100c (Step 880). A portion of the steam condenses upon making contact with the preheater tube bundle 110 positioned within the third vessel 100d. Fresh water F can then be produced (Step 890). Fresh water F can then be collected at the bottom of the housing 120 positioned within the third vessel 100c (Step 900). The process continues as described in Step 660. It is to be noted that the steam produced from the evaporation of the saline water SW making contact with the plurality of heat tubes 400 in bundle B2 can pass into the third vessel 100c, as illustrated by S3'. The saline water SW that does not make contact with the plurality of heat tubes 400 in bundle B2 and does not evaporate, however, collects at the bottom of the second vessel 100b and continues as described in Step 680.

The portion of the saline water SW in the second tube 140 that is not discharged through the second sprayer 190b as described in Step 850 continues through the second tube 140 and can be fed into the preheater tube bundle 110 positioned in the first vessel 100a (Step 910). The saline water SW pumped through the preheater tube bundle 110 positioned in the first vessel 100a can be discharged through the first sprayer 190a onto the plurality of heat tubes 400 in bundle B1 (Step 920). The saline water SW that is discharged by the first sprayer 190a can make contact with the plurality of heat tubes 400 in bundle B1 and can be partially evaporated or transformed to steam (Step 930). The steam can then pass into the plurality of heat tubes 400 in bundle B2 (Step 940).

The steam that passes through the plurality of heat tubes 400 in bundle B2 can be partially condensed inside the plurality of heat tubes 400 and the remaining steam can heat the saline water SW in the preheater tube bundle 110 positioned within the second vessel 100b (Step 950). A portion of the steam condenses upon making contact with the preheater tube bundle 110 positioned within the second vessel 100b. Fresh water F can then be produced (Step 960).

Fresh water F can be then collected at the bottom of the housing 120 positioned within the second vessel 100b (Step 970). The process continues as described in Step 660. It is to be noted that the steam produced from the evaporation of the saline water SW making contact with the plurality of heat tubes 400 in bundle B1 can pass into the second vessel 100b, as illustrated by S3'. The saline water SW that does not make contact with the plurality of heat tubes 400 in bundle B1 and does not evaporate, however, collects at the bottom of the first vessel 100a and continues as described in Step 680.

It is to be noted that the combination steam S3 being released into the plurality of heat tubes 400 in the first vessel 100a can heat the saline water SW flowing through the preheater tube bundle 110 positioned within the first vessel 100a. The combination steam S3 can be partially condensed inside the plurality of the heat tubes 400 and the remaining steam S3 can be condensed upon making contact with the preheater tube bundle 110 positioned within the first vessel 100a, thereby forming fresh water F (Step 980) that can be collected at the bottom of the housing 120 within the first vessel 100a (Step 990) and can subsequently be pumped into the fresh water tank FWT, thereby ending the process as described in Step 660.

It is to be understood that the present invention is not limited to the embodiments described above, but encompasses any and all embodiments within the scope of the following claims.

We claim:

1. A multi-effects desalination system, comprising:
   a steam source;
   a thermal vapor compressor unit operatively providing a first source of steam, the compressor unit having an input for receiving steam from the steam source, and at least one additional input;
   at least three vessels, each vessel consisting of:
      a plurality of heat tubes, each heat tube having a first end operatively configured to receive the steam, and a second end operatively configured for releasing uncondensed steam;
      a housing operatively coupled to the heat tubes for receiving the uncondensed steam released from each of the heat tubes, the housing further including:
         a preheater tube bundle; and
         means for collecting and discharging fresh water;
      a plurality of sprayers coupled to the preheater bundle, the plurality of sprayers operatively configured for dispersing saline water onto the heat tubes;
      means for collecting and discharging brine water;
   a source fluid coupling for transferring the first source of steam from the compressor unit to the first end of the plurality of heat tubes in the first vessel;
   first fluid couplings between each pair of the at least three vessels for transferring the discharged brine water to the successive vessel, each of the first fluid couplings having a pump;
   second fluid couplings connected to each of the at least three vessels for transferring the discharged fresh water, each of the second fluid couplings having a pump;
   third fluid couplings between each pair of the at least three vessels for transferring the uncondensed steam from each housing to the successive first ends of the heat tubes of the successive vessels;
   fourth fluid couplings selectively coupling the third and successive vessels of the at least three vessels for transferring a portion of the uncondensed steam to the compressor unit;
   a condenser for receiving cooling fluid from the saline water source, and operatively configured to distribute saline water to each preheater tube bundle in each housing of each vessel;
   a first pump operatively coupled for pumping the saline water from a saline water source into the condenser;
   a second pump operatively coupled for pumping the saline water from the condenser to a first of the at least three vessels;
   a third pump operatively couple for pumping fresh water from each of the at least three vessels to a fresh water tank; and
   a fourth pump operatively couple for pumping brine water to the saline water source.

2. The multi effects desalination system according to claim 1, wherein the steam source comprises a boiler.

3. The multi effects desalination system according to claim 1, further comprising a power source operatively coupled to each of the first, second, third, and fourth pumps.

4. The multi effects desalination system according to claim 1, wherein compressor unit comprises a mechanical compressor unit.

5. The multi effects desalination system according to claim 4, wherein the mechanical compressor unit selectively receives power from a power source.

6. The multi effects desalination system according to claim 3, wherein the power source is selected from the group consisting of generator, solar panels, and wind turbines.

* * * * *